Jan. 14, 1941.  W. H. WALLS  2,228,917
COMBINED CLUTCH AND BRAKE CONTROL FOR TRACTORS
Filed March 4, 1939
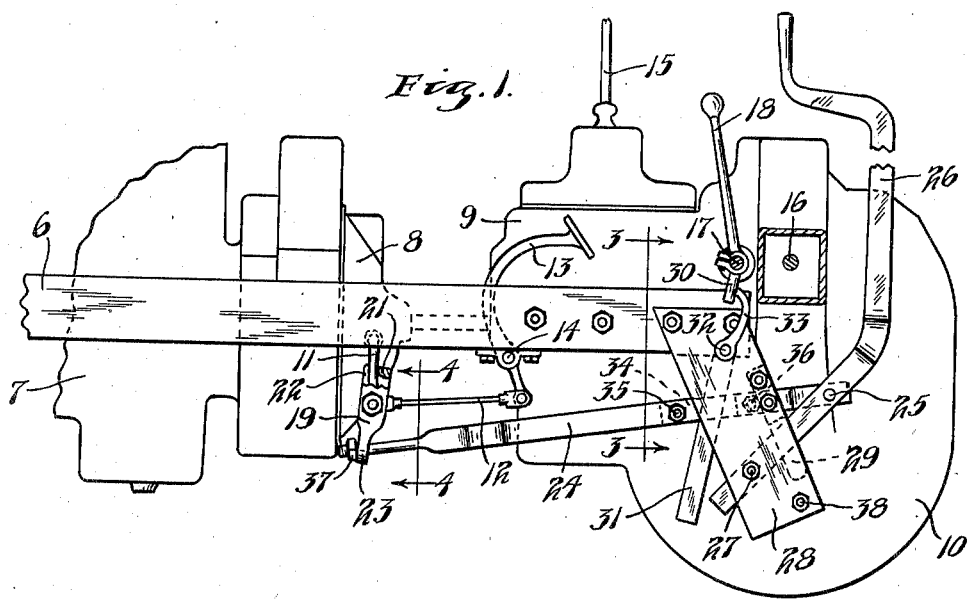
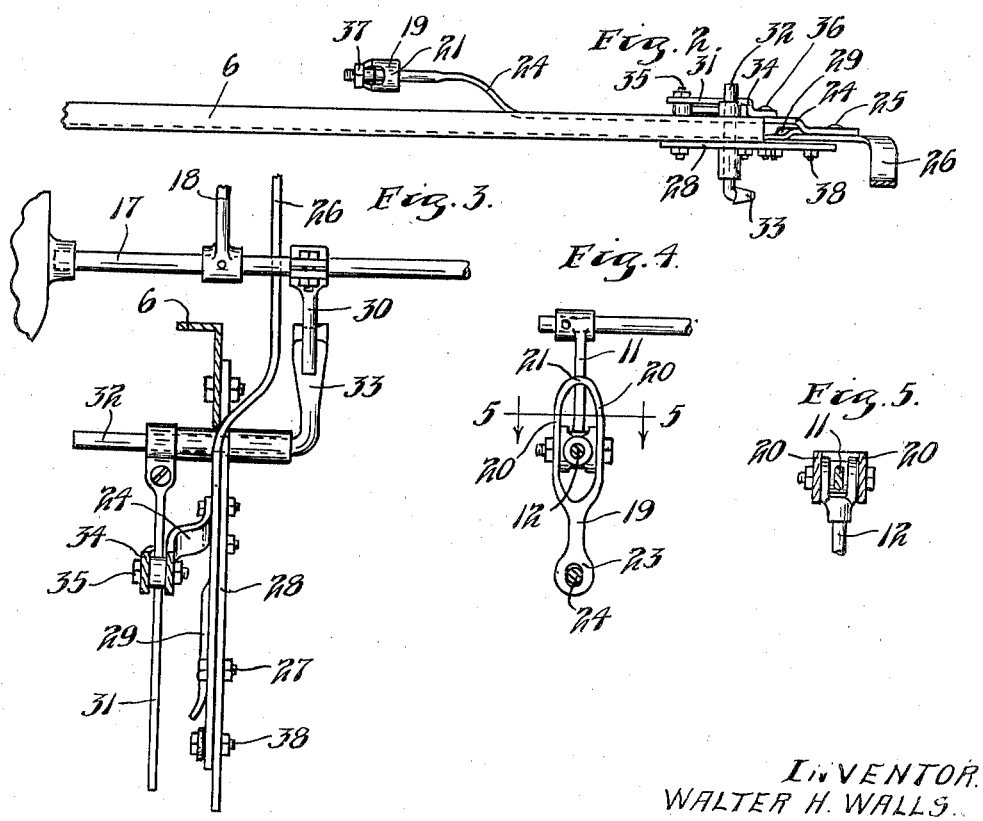
INVENTOR.
WALTER H. WALLS
BY HIS ATTORNEYS.
Williamson & Williamson Patented Jan. 14, 1941

2,228,917

UNITED STATES PATENT OFFICE 2,228,917

COMBINED CLUTCH AND BRAKE CONTROL FOR TRACTORS

Walter H. Walls, Darwin, Minn.

Application March 4, 1939, Serial No. 259,811

3 Claims. (Cl. 192—13)

This invention relates to motor vehicles and more particularly to the operation of motor powered tractors.

The use of motor powered tractors in industry and agriculture has become widespread, and on farms particularly they have to a great extent replaced the horse for drawing plows, harrows, reapers, and other farm equipment. When a tractor is used for drawing farm machinery, it is frequently necessary to change the draw bar hitch or to do some similar operation where it is necessary for the operator to dismount from the tractor seat and stand between the rear end of the tractor and the farm equipment which it is drawing. If he is hitching or unhitching a piece of machinery from the tractor, it may be necessary to move the tractor forwardly and rearwardly one or more times in order to get the two pieces of equipment in proper relationship. With tractor control mechanism of a conventional type these movements of the tractor can only be made by climbing back up on the tractor and actuating the control mechanism which includes a clutch, a transmission gear shifting lever, and a brake. The result is a waste of time and energy.

It is a general object of my invention, therefore, to provide tractor control mechanism wherein the clutch and brake actuators can be independently operated in the usual manner from the driver's seat and which can also be operated as a unit with a single control when the farmer is standing on the ground adjacent the rear end of the tractor. It is possible to not only actuate the clutch and brake from such a position, but also to shift the transmission gearing so that the tractor can be driven forwardly or rearwardly while the operator is standing on the ground, and this movement is controlled in such a manner that the operator is always perfectly safe.

Another object of the invention is to provide such control mechanism for tractors which can be quickly and easily installed on any conventional make of tractor.

A further object of the invention is to provide the above described type of control wherein the clutch will be released prior to application of the brake to prevent wear of the clutch and to keep from choking the engine.

Still another object of the invention is to provide both independent and unitary clutch and brake actuating mechanism wherein the unitary or auxiliary actuating mechanism can be locked in a position which maintains the clutch released and the brake applied.

These and other objects and advantages of the invention will more fully appear from the following description made in connection with the accompanying drawing, wherein like reference characters refer to the same parts throughout the views, and, in which:

Fig. 1 is a side elevation of the rear portion of an engine and the clutch, power transmission and differential gearing units with my invention installed;

Fig. 2 is a plan view of my improved control mechanism showing the rear portion of one of the vehicle side frame members;

Fig. 3 is a vertical section taken approximately on the line 3—3 of Fig. 1;

Fig. 4 is a vertical section taken approximately on the line 4—4 of Fig. 1; and

Fig. 5 is a horizontal section taken approximately on the line 5—5 of Fig. 4.

In Fig. 1 there is shown portions of a motor driven tractor including a side frame element 6, the rear portion of a motor 7, a clutch housing 8, a power transmission housing 9, and a differential housing 10. A crank-like shaft member 11 extends laterally of the clutch housing and constitutes a clutch actuating shaft and this shaft is connected by a link 12 to a foot lever 13 which is pivotally mounted at 14 so that application of foot pressure will draw the link 12 backwardly and oscillate the shaft member 11 to release the normally interengaging faces of the usual clutch device. Extending from the top of the transmission housing 9 is a transmission gear shifting lever 15 such as is found on motor vehicles including tractors. A rear driving axle is shown at 16, and a shaft 17 extending laterally from the differential housing 10 is adapted to be connected to suitable conventional brake mechanism which is not shown in the drawing. The brake shaft 17 is normally operated by a hand lever 18.

Pivotally connected to the outer end of the clutch shaft member 11 is a lever 19 which, as shown in Figs. 1, 4, and 5, includes a pair of vertically spaced arms 20 which are connected at one side by a bridge 21. The opposite upper portions of the spaced arms 20 are open as at 22 and the vertical portion of the clutch shaft member 11 extends upwardly from its point of pivotal connection with the lever 19 between the arms 20 and forwardly of the bridge 21. The lower end of the lever 19 is provided with a loop or eye 23 and said loop slidably receives the rounded end of a rearwardly extending link 24. The rear end of the link 24 is pivotally connected at 25 to an upstanding hand lever 26 which is pivotally connected at 27 to a plate 28 secured to the side frame member 6. An offset friction tongue 29 is connected to the plate 28 to hold the hand lever 26 against lateral movement and to frictionally retain the hand lever 26 in an upright position. Of course, if desired, a coil spring can be connected between the link 24 and the frame to keep the auxiliary operating mechanism in an off position.

The brake shaft 17 has a short finger 30 connected thereto and extending downwardly from the shaft. A lever 31 is connected to a short stub shaft 32 and a short curved arm 33 extends from the shaft 32 and is in contact engagement with the finger 30 on the brake shaft 17. The lever 31 lies beside the rearwardly extending link 24 and is retained against lateral movement by a short offset plate 34 which is secured in spaced relation to the rearwardly extending link 24 by means of bolts 35 and 36.

Actuation of the clutch shaft member 11 can be secured through foot pressure on the pedal 13 as described above to disengage the clutch, and this movement will cause the lever 19 to be drawn rearwardly without actuating the rearwardly extending link 24 due to the unobstructed rounded end of said lever rearwardly of said link so that foot pressure operation of the clutch will not effect the position or cause movement of said link 24. Furthermore, the brake lever 13 can be pulled rearwardly to apply the usual brake and prevent movement of the tractor, and this independent brake actuation does not effect the curved arm 33, the lever 31, or the rearwardly extending link 24 since the finger 30 on the brake shaft 17 will move forwardly and exert no pull or pressure on the curved element 33.

When the operator is standing on the ground and is not in a position to press his foot on the pedal 13 and actuate the brake 18 in conjunction therewith he can operate the clutch and brake elements by pulling the rearward hand lever 26 in a rearward direction. This pulls the rearwardly extending link 24 in the same direction and the nut or abutment 37 on the forward end of link 24 will engage the lower end of the clutch connecting lever 19. The bridge 21 connecting the arms on the lever 19 at the rear side of the clutch shaft member 11 will cause said shaft with its crank-shaped portion to be partially rotated in a counter-clockwise direction. Movement of the clutch shaft member 11 to disengage the clutch is accomplished before the bolt 35 on link 24 moves rearwardly into contact with the downwardly hanging lever 31 in the auxiliary brake operator. Upon contact of bolt 35 with lever 31, continued rearward movement of link 24 will cause said lever 31 to swing rearwardly and the curved arm 33 to move forwardly against the finger 30 on the brake shaft 17. This movement results in an application of the brake.

When the rearwardly positioned hand lever 26 is swung forwardly again, the above described operation will take place in reverse releasing the brake and thereafter upon a continued forward movement of the hand lever 26 and rearwardly extending link 24 will release the clutch. For this reason the operator can drive the tractor forwardly or rearwardly while standing on the ground by pulling the hand lever 26 back to disengage the clutch and set the brake and then move the gear shifting lever 15 into lower forward gear or into reverse gear after which the hand lever 26 can be pushed forwardly to release first the brake and then the clutch to produce forward or rearward movement of the tractor.

If the operator is standing on the ground behind the tractor, there is danger of injury due to accidental release of brake and clutch while the tractor is in gear, and for that reason I have provided means for locking the auxiliary combined clutch and brake control. On the plate 28 which extends downwardly from the frame 6 is a pin 38 which is positioned farther from the rearwardly extending link 24 in a lateral or downward direction than is the pivot 27 which is the pivot point of the hand lever 26. Said hand lever can be drawn rearwardly or in a combined rearward and downward movement to a point where the lever 26 engages the stop 38. In this position the lever 24 has moved past the hand lever pivot 27 and the link 24 and lever 26 are in what might be termed an over-center locked position. Thus it is impossible for the clutch and brake to become disengaged except by upward and forward swinging of the hand lever 26.

From the foregoing description it will be seen that I have provided a relatively simply constructed yet safe and efficient attachment for motor vehicles and more particularly motor driven tractors wherein the clutch and brake can be operated as a unit with a single control while at the same time these elements can be otherwise operated independently of each other with the usual actuating levers provided therefor. The structure is so arranged that the clutch will be disengaged before the brake is applied and the brake will be released before the clutch is again engaged. The auxiliary operating apparatus can be locked in clutch disengaging and brake applying position to insure the safety of the operator who might be standing in the line of movement of the vehicle, and the operator can drive the machine forwardly or rearwardly without having to climb into the usual operating position on the machine. My invention can be adapted for use with any type of tractor with a possible slight alteration of arrangement and shape of the parts.

It will, of course, be understood that various changes may be made in the form, details, arrangement and proportions of the various parts without departing from the scope of my invention.

What is claimed is:

1. In a tractor type motor vehicle having an engine, a clutch, a power transmission, brake mechanism and a rear axle, an independent clutch operating lever, an independent brake operating lever, and a combined clutch and brake operating lever connected between said independent clutch and brake operators to permit substantially simultaneous clutch and brake actuation with a single operating device, said combined clutch and brake operating lever being located adjacent the rear axle of the vehicle, whereby the operator can stand behind the vehicle and control movement of the same when engaging and disengaging devices to be drawn by the vehicle.

2. In a tractor type motor vehicle having an engine, a clutch, a power transmission, a brake mechanism and a rear axle, an independently movable clutch operating lever, an independently movable brake operating lever, and a combined clutch and brake operating lever connected between said independent clutch and brake operators for unitary movement of said latter operators, said combined operator including an actuating handle mounted rearwardly of said rear axle.

3. In a tractor type motor vehicle having an engine, a clutch, brake mechanism and a rear axle, an independently movable clutch operating lever, an independently movable brake operating lever, a link connecting said clutch operator with said brake operator, a link operating arm connected thereto, said arm having a pivotal support located laterally of and intermediate the ends of the link, and a stop for said link operating arm positioned laterally of said link beyond said pivot, whereby said operating arm can be swung over a center to said stop and be retained in locked position.

WALTER H. WALLS.